US006834229B2

(12) United States Patent
Rafiah et al.

(10) Patent No.: US 6,834,229 B2
(45) Date of Patent: Dec. 21, 2004

(54) INTEGRATED JOURNEY PLANNER

(75) Inventors: Moshe Rafiah, London (GB); James Robert Rice, London (GB); John Spencer Guy Ferguson, London (GB); Andrew John Sadler, London (GB); Paul Richard Harrison, Surrey (GB)

(73) Assignee: Travelfusion Limited, London (GB)

( * ) Notice: Subject to any disclaimer, the term of this patent is extended or adjusted under 35 U.S.C. 154(b) by 0 days.

(21) Appl. No.: 10/204,934

(22) PCT Filed: Feb. 2, 2001

(86) PCT No.: PCT/GB01/00441

§ 371 (c)(1),
(2), (4) Date: Oct. 18, 2002

(87) PCT Pub. No.: WO01/59633

PCT Pub. Date: Aug. 16, 2001

(65) Prior Publication Data

US 2003/0109266 A1 Jun. 12, 2003

(51) Int. Cl.[7] .............................................. G06F 17/60
(52) U.S. Cl. ....................... 701/201; 701/209; 701/210
(58) Field of Search ................................ 701/201, 209, 701/202, 207, 210; 340/995.19; 705/6

(56) References Cited

U.S. PATENT DOCUMENTS

| | | | |
|---|---|---|---|
| 5,586,219 A | | 12/1996 | Yufik |
| 5,802,492 A | | 9/1998 | DeLorme et al. |
| 5,845,228 A | * | 12/1998 | Uekawa et al. ............. 701/209 |
| 5,938,720 A | * | 8/1999 | Tamai ........................ 701/209 |
| 6,038,508 A | * | 3/2000 | Maekawa et al. ........... 701/207 |
| 6,184,823 B1 | * | 2/2001 | Smith et al. ............ 342/357.13 |
| 6,208,934 B1 | * | 3/2001 | Bechtolsheim et al. ..... 701/209 |
| 6,401,030 B1 | * | 6/2002 | Watanabe et al. ........... 701/202 |
| 6,421,606 B1 | * | 7/2002 | Asai et al. .................. 701/209 |
| 6,622,084 B2 | * | 9/2003 | Cardno et al. .............. 701/202 |
| 6,658,093 B1 | * | 12/2003 | Langseth et al. ......... 379/88.17 |
| 6,687,608 B2 | * | 2/2004 | Sugimoto et al. ........... 701/207 |
| 6,691,026 B2 | * | 2/2004 | Odinak et al. .............. 701/202 |
| 6,707,421 B1 | * | 3/2004 | Drury et al. ............. 342/357.1 |
| 2002/0111935 A1 | * | 8/2002 | Jones et al. .................... 707/1 |

FOREIGN PATENT DOCUMENTS

| | | |
|---|---|---|
| WO | WO 89/07798 A1 | 8/1989 |
| WO | WO 96/39689 A1 | 12/1996 |

OTHER PUBLICATIONS

D.T. Ndumu, J.C. Collis and H.S. Nwana; Towards desktop personal travel agents; BT Technology Journal; Jul. 1998; pp. 69–78; vol. 16 No. 3.

* cited by examiner

Primary Examiner—Michael J. Zanelli
(74) Attorney, Agent, or Firm—Stevens & Showalter LLP

(57) ABSTRACT

An integrated journey planner deconstructs user enquiries into information requests, each specifying a journey part using a single transport mode, e.g., rail, car or coach. The planner sends each request to one of a plurality of local and on-line databases, each corresponding to a different transport mode. Responses from the databases are reconstructed into multi-modal travel option(s) for the user specified journey, incorporating different transport modes. The multi-modal travel option(s) incorporates timetable travel information and non-timetable travel information. Also, a user can specify a geographical location and a transport mode to find the most suitable terminals and services for uni-modal point to point travel.

82 Claims, 7 Drawing Sheets

INTEGRATED JOURNEY PLANNER

BACKGROUND OF THE INVENTION

The present invention concerns improvements relating to journey planning and more particularly though not exclusively to an integrated journey planner and a method of providing integrated journey travel information. The integrated journey planner, more specifically referred to as a Comparison Navigator™, can combine timetabled information (for rail for example) and non-timetabled information (for cars for example) to provide integrated journey information. A specific road routing engine for implementing searches between user selected geographical locations to return the best road route, according to user preferences (usually speed), can also be used with the integrated journey planner.

While Europe, for example, enjoys a sophisticated public transport and road network system, journey planning is not a straightforward process. Deciding on how to get between different geographical locations usually entails multiple enquiries to different operators and/or reliance on travel agents or other intermediaries.

There are several different ways in which journey planning can be achieved at present and these are described in turn.

One of the most common types of systems currently employed is a central reservations system (CRS). Examples of some of the largest CRSs are Sabre. Amadeus Gallileo and Worldspan. Each of these systems has a large corporate client base and provides information mainly to corporate/travel agent clientele.

These systems rely on huge centralised databases of information which are accessible for travel information, for checking holiday availability and for making bookings. Travel information is usually provided regarding terminus to terminus (airport to airport for example) travel and requires an experienced operator familiar with specific system commands to access the information. Accordingly, customers normally access the database indirectly by using a travel agent who subscribes to the central reservations system.

The expertise and legacy mainframes of these systems are more designed towards bookings/reservations, than travel planning. The type of information obtained from these central databases is limited to a single operator or to a single mode of transport such as air or rail and cannot provide details regarding other modes of travel and cannot provide any integrated travel information. By integrated travel information (also known as multi-modal travel information) it is meant information linking together different modes of transport of different service providers to provide information for a single journey. Furthermore, the information can only be provided between predetermined access points of the service provider's network, with the user having to determine themselves where the most appropriate (usually nearest) access points to the network are from where they wish to start and finish their journey.

Dedicated on-line travel systems have recently entered the journey planning market place. These companies provide greater accessibility than CRSs because they enable customers to have direct access to them via the Internet. Examples of companies currently providing these services are expedia.com ebookers.com. travelocity.com, previewtravel.com, biztravel.com. and thetrip.com. Whilst the on-line user interface has been improved to enable non-experienced browsers to use the system, each on-line travel system is ultimately powered by a CRS and still suffers from the most of the limitations ascribed to this type of system.

These on-line travel systems now offer so called 'comprehensive' travel information and reservation facilities. All are accompanied by map viewing options, local resort information, country information and some degree of journey planning. However, they feature only air, hotel, car rental and holiday packages services. No other transport options are available for booking. Moreover, none of the services is designed or capable of providing user-defined location-to-location (point-to-point) journey details or multi-modal travel planning.

Recently, a few autoroute planning services have been created for use over the Internet. Examples of these are mapquest.com, mapblast.com and mapsonus.com. While successful and impressive, all are very US biased and are strictly focused on one means of transport—the car. Many offer only limited interactivity and generally use severely restricted map data sets: this ultimately is determined by a geographic database which supports the service. The dominant player. Mapquest is beginning to offer street level road planning in the UK. Michelin which also started recently, is the first service to offer a complete European road route planning service over the Internet.

Germany's national railway (bahn.de) has set up an Internet journey planning facility covering Continental Europe. The service offers only train planning, road journeys, for example, are not available. The service has recently incorporated an e-ticketing facility, although that is restricted to journeys starting from Germany.

All of the existing journey planners require the user to identify start and end locations (termini) for a mode of transport which have been selected by the user as being the most appropriate to their actual start and end locations. This may frequently waste time as the terminus selected may not be included on a particular service provider's network. For example, if a user lives in Watford and wishes to go to Geldrop (a suburb of Eindhoven in the Netherlands) they may select the closest airports Luton and Eindhoven. However, there may not be any possible flight from Luton to Eindhoven or the service provider who does fly to Eindhoven may not have Luton on their service network. Rather it may only be possible to fly from City Airport to Eindhoven or Heathrow to Eindhoven and the user would either simply not be able to determine a possible travel option or would spend a great deal of time trying out different termini combinations until one combination provided a possible option.

All of the above Internet journey planners are limited to a single mode of transport and do not address any issues relating to a total integrated multi-modal travel planning facility. Further the comparison of different modes of transport is not possible.

Over the past 25 years no European service has been able to offer truly integrated journey services on anything near a national, let alone, a Continental scale. The fragmented nature of the different transport groups, many of which are still in nationalised ownership, have made the task of data collection and system integration difficult. Even the recent emergence of Internet based journey planners in Europe, which enable users to make bookings themselves directly, typically only cover one mode of transport, thereby failing to inform users on all (and the most suitable) transport options available.

In summary, all the above existing systems fall significantly short both in the scope of transport options made available to the customer and in the integrated and comparative approach required for a travel planning service.

The present invention seeks to overcome at least some of the above described problems and other limitations of the prior art approaches.

It is desired to provide a method and system for providing complete journey information from user defined start and end points which are not restricted to predefined locations on a transport network.

It is also desired to provide an integrated travel planning system which provides the user with all of the currently available transport options for getting between two locations.

SUMMARY OF THE INVENTION

According to one aspect of the present invention there is provided a method of providing journey information to a user, the method comprising: receiving unique location reference information identifying the start and end locations of the user-defined journey; considering at least some possible predetermined pairs of access points to a transport network of a single mode of transport, the access points being at different locations than the start and end locations; selecting those pairs of access points which minimize a selection factor between the start and end locations and the access points respectively; generating an information request containing a selected pair of access points and sending the request to a knowledge store holding information regarding the single mode of transport; and constructing a travel option for the user specified journey from the response received from the knowledge store.

The present invention, which is embodied in a service product called a Comparison Navigator™, provides a significant advantage over the prior art systems in that it lets the user determine the start and end points of the journey in an unrestricted way. There is no need for the user to select a network terminal for a given transport service provider, as the present invention can provide the most appropriate terminal for the user's requirements. Therefore, advantageously the user does not have to have any knowledge current of otherwise of schedules or operation configurations of travel service providers to plan a journey.

Preferably the selection factor comprises the route cost, the route distance or the route travelling time between the access points and the start and end locations. These factors enable the most appropriate access point to the user-defined location to be selected. The selection factor may be weighted by consideration of the distance of the user-defined journey. This enables the issue of the user connection to the access point to be considered in context with the overall journey. For example, a user living in Exeter may be prepared travel to London to take a flight to Jamaica but may not consider it appropriate to travel to London for a flight to Glasgow.

The considering step may comprise for a given service operator considering only those pairs of access points which are available as part of the service operator's network service. This optimisation speeds up the process of identifying the most appropriate access points to make a routing request. Therefore, the user can simply specify a particular service operator and the most appropriate access points to the service provider's network are provided.

According to another aspect of the present invention there is provided a system for providing journey information to a user, the system comprising: input means for receiving unique location reference information identifying the start and end locations of the user-defined journey; means for considering at least some possible predetermined pairs of access points to a transport network of a single mode of transport, the access points being at different locations than the start and end locations, selection means for selecting those pairs of access points which minimise a selection factor between the start and end locations and the access points respectively; requesting means for generating an information request containing a selected pair of access points and sending the request to a knowledge store holding information regarding the single mode of transport; and constructing means for constructing a travel option for the user specified journey from the response received from the knowledge store.

The present invention also extends to a computer program comprising instructions for causing a computer to perform the above described method. It is to be appreciated that the computer program may be embodied on a recording medium or on an electrical carrier signal.

According to another aspect of the present invention there is provided an integrated journey planner for providing travel information for a user specified journey; the journey planner comprising: means for deconstructing a user enquiry specifying the journey into a plurality of information requests, each specifying a part of the journey using a single mode of transport; means for sending each request to an appropriate one of a plurality of knowledge stores, each store holding travel information regarding a different mode of transport, and means for reconstructing the responses to the requests received from the plurality of knowledge stores into at least one multi-modal travel option, for the user specified journey, incorporating different modes of transport.

In this way, fully integrated multi-modal travel planning services can be provided to the customer. It enables on a single screen, display of all the possible routes, modes of transport, fares, times and distance to get travellers to their desired destination. Furthermore, the planner can be arranged to provide a real-time reservation service via the Internet such that the best trip can simply he booked by one mouse click.

The integrated travel planner provides a centralised point to find out how best to get from A to B. The customer only has to determine 'start' and 'end' points and the planner can calculate and compare all the possible routes and transport options, together with; full timetables, turn by turn driving instructions (where applicable), fares, weather report enroute, points of interest, traffic information etc. If a user enters preference information in an enquiry, the results can be filtered or ranked according to the users preferences. A detailed analysis of all the relevant transport options based on the traveller's budget, speed and comfort requirements can be readily provided.

An example of how the multi-modal travel planning sea vice provides the user with more travel options than have ever been available from a single enquiry is now provided. A typical example is a trip from a location in London to a location in Paris which the customer enters as an enquiry. On the customer's screen, the following travel option information would be provided:

By Car, By Ferry, By Car:
'drive to Dover (turn by turn directions)—take the P&O ferry (relevant timetables displayed) to Calais—drive to specified location in Paris (turn by turn directions)':
By Tube, By Train, By Tube:
'take the Underground to Waterloo (station and line interchange directions)—board the Eurostar to Gare De Nord.

Paris (complete with relevant timetables, fares, availability and 'Book Now' options)'—take the Paris Metro to the station nearest the specified location (station and line interchange directions):

By Tube, By Air, By Tube:

'take the Underground to Heathrow (station and line interchange directions)—take Air France to Paris (relevant timetables, fares, availability and 'Book Now' options)', take the Paris Metro to the station nearest the specified location (station and line interchange directions):

By Tube, By Air, By Tube:

'take the Underground to Heathrow (station and line interchange directions)—take British Airways to Paris (relevant timetables, fares, availability and 'Book Now' options)', take the Paris Metro to the station nearest the specified location (station and line interchange directions):

By Car, By Air, By Car:

'drive to Heathrow (turn by turn directions)—take Air France to Paris (relevant timetables, fares, availability and 'Book Now' options)'—drive to specified location in Paris (turn by turn directions)':

By Car, By Air, By Car:

'drive to Heathrow (turn by turn directions)—take Swissair to Paris (relevant timetables, fares, availability and 'Book Now' options)'—drive to specified location in Paris (turn by turn directions)';

Clearly there would be many different possible options and in order to make the determined data as relevant as possible, the results are preferably ranked according to a user specified criteria for example, speed, cost, timing, most scenic route.

Preferably, the integrated journey planner further comprises a user enquiry processing means for understanding and linking the enquiry to associated locally stored data.

The processing means may advantageously comprise a name resolver arranged to interpret the user specified journey by finding the closest matches of pre-stored data to the user specified journey and arranged to use artificial intelligence to determine its acceptance. This simplifies use of the travel planner because it has the ability to tolerate misspellings and human error.

The name resolver may be arranged to provide a list of closest matches for user selection if the user specified journey is sufficiently different from the closest matching pre-stored data. In this way the planner can even make intelligent suggestions as to the likely locations the user wished to enter.

Preferably, the integrated journey planner further comprises an assignment means for assigning pre-stored data to a data record representing the user enquiry, the pre-stored data being associated with the user specified journey. This enables huge optimisation of the journey planning process to be achieved. For example, if the respective areas in which two user entered locations are situated can be obtained in this way, then all of the relevant pre-stored travel interconnection information between the start and end locations becomes available very quickly by means of a simple look-up table.

Furthermore, the assignment means may be arranged to assign to the start and end locations of the user defined journey, the closest known access points to a transport network for each mode of transport. This also reduces the computational burden and thereby increases the speed in determining a route between the start and end locations using each of the possible transport options.

The deconstructing means is preferably arranged to breakdown the specified journey on a geographical basis per transport mode and then in order to generate the minimum necessary time information, send off a batch of search requests in parallel the results of which will generate time information for the next batch to be sent off, and so on. This is a compromise between speed and minimal of data generation/accuracy but provides a practical optimum solution.

The present invention also extends to a method of providing integrated journey travel information between two user selected locations, the method comprising: deconstructing a user enquire specifying the two locations into a plurality of requests each specifying part of the journey using a single mode of transport; sending each request to an appropriate one of a plurality of knowledge stores, each store holding travel information regarding a different mode of transport: and reconstructing the responses to the requests received from the plurality of knowledge stores into at least one journey option, between the two user selected locations, incorporating different modes of transport.

According to another aspect of the present invention there is provided a method of providing integrated journey travel information for a user specified journey; the method comprising: sending a plurality of requests, each representing part of the journey, to a plurality of knowledge stores, said stores providing timetabled and non-timetabled information regarding different modes of transport; and reconstructing the responses to the requests received from the plurality of knowledge stores into at least one multi-modal transport option, for the user specified journey, incorporating timetabled and non-timetabled modes of transport. In this way, road routing data can advantageously be combined with any travel information from any service provider.

According to another aspect of the present invention there is provided a method of determining a route between start and end map locations, the method comprising: searching a network of nodes, representing road data at a plurality of geographic road locations and neighbouring locations, in a recursive manner to establish a route between the nodes representing the start and the end locations; and traversing the selected route from the end node to the start node optimising the route selection along the route from each intermediate node to the end node.

This is a powerful way of obtaining road information which is particularly suited to providing fast data accesses. This is optimised if the method further comprises creating the network of nodes representing road data at a plurality of geographic road locations, each node storing information about its neighbouring nodes. This network representation enables rapid implementation of the search algorithm.

According to yet another aspect of the present invention there is provided a method of determining a unique location reference from user-specified location name, the method comprising: reading a user-specified location name; interpreting the user-specified location name by finding the closest matches thereto from pre-stored location names having predetermined unique location references associated therewith; accessing demographic data regarding the closest matches from a geographic/demographic database of the predetermined location references; and ranking the closest matches in order of the demographic size of each possible match.

Presently preferred embodiments of the present invention incorporate most if not all of the above described features and subsequently have distinct advantages over the prior art methods and systems. More specifically, the present embodiments can be considered to be travel planning and navigation service technology platforms. They offer a complete and comparative mobility solution—from planning a journey, comparing the options, optimising the route to booking. Based on the user's location, the present embodiments can calculate the nearest and best stations/airports/ferry ports, optimise the best routes, create uni and multi-modal travel alternatives and combine the journey solutions with a real-time XML/HTML database interrogation function to offer a personalised comparative menu on the best ways to get from user-defined start to finish locations. The embodiments can support real-time travel conditions and location sensitive parameters to further guide and track users on the go and can deliver up-to-date timetables, cost comparisons and booking functionality.

The presently preferred embodiments deliver a location-based journey solution that combines real-time information about public and private travel options in relation to the traveller's precise location and preferences. As will be elaborated later, the process begins with the interpretation of the user location information (delivered either manually or via automated GPS and/or wireless network applications using, for example, the Wireless Application Protocol (WAP) which is an industry standard for providing Internet access and other services, such as email, over wireless networks and is designed to provide such services to digital mobile telephones and other wireless terminals across different types of wireless networks). Once the XY (co-ordinates) positions of a start and an end point of a journey have been established, the system calculates the best ways of carrying out the journey. Algorithms factor in the most suitable (often nearest) airports, stations and ferry ports and construct optimised uni/multi-modal ways of going about the journey. Also factored In are user preferences for speed, cost or travel via desired points and the best travel companies that can satisfy the full/parts of the journey. Real-time processing of timetable, price and availability takes part simultaneously to routes construction and multiple route engines (road, timetable or direct web links) are called to provide the relevant information. Final processing then delivers an integrated comparative view on multiple journey options. Uniquely, users receive comparisons between different modes of transport and a variety of multi-modal journey solutions. All options give real-time cost, time, duration, timetables, directions and links to online booking and reservation. The information can be delivered on any digital platform and device.

BRIEF DESCRIPTION OF THE DRAWINGS

Preferred embodiments of the present invention will now be described by way of example with reference to the accompanying drawings. In the drawings.

DETAILED DESCRIPTION OF THE INVENTION

Figure 1:
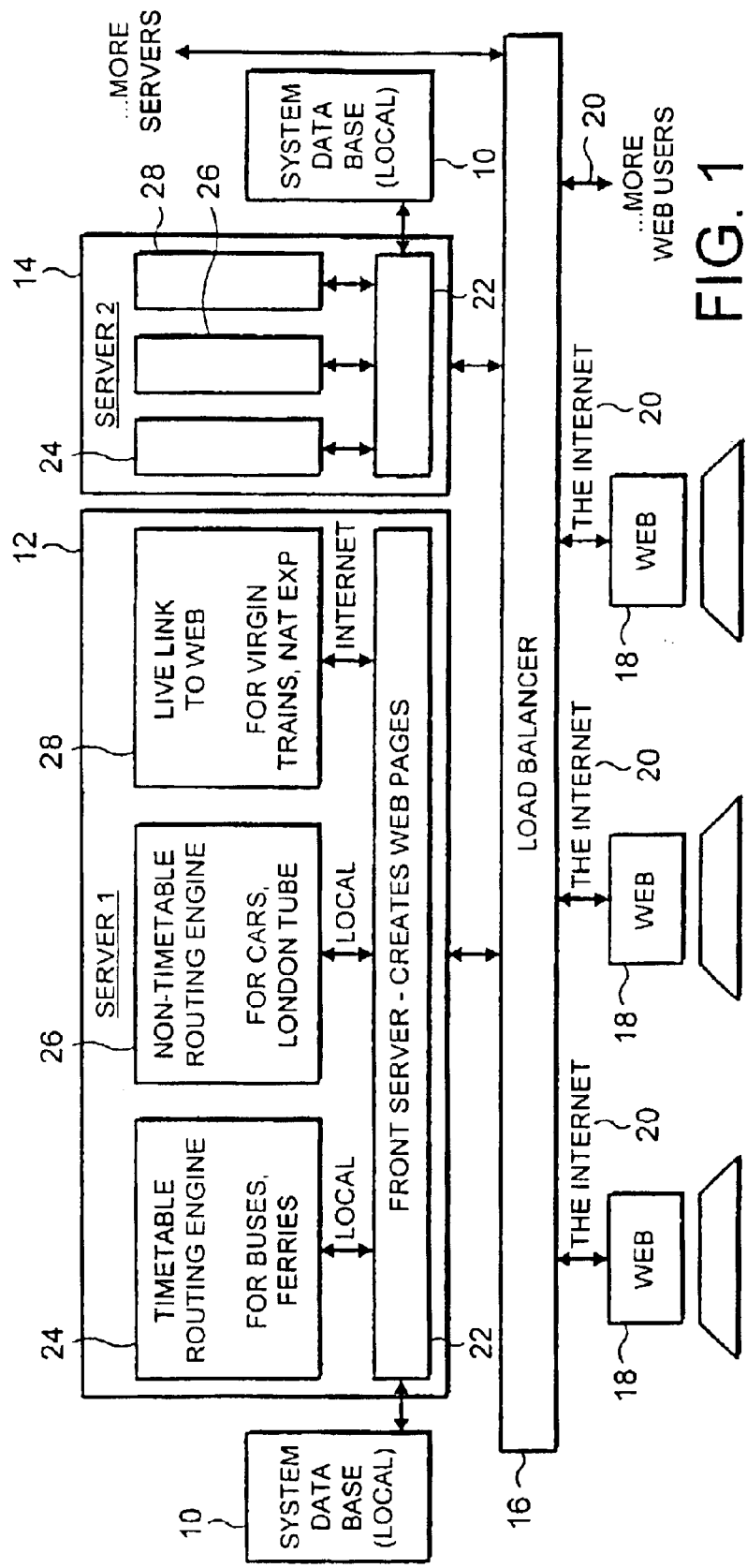
FIG. 1 is a schematic block diagram of a multi-modal travel information system according to a first embodiment of the present invention.

Referring to FIG. 1, a multi-modal travel information system of a first embodiment of the present invention comprises a plurality of identical system databases 10, a first server 12, a second server 14, further servers (not shown) and a load balancer 16. Each server 12, 14 has access to its own system database to avoid data access bottlenecks. Access to the information system by a plurality of web users 18 is provided via the Internet 20.

Each of the system databases 10, which have a flat file structure (though in an alternative embodiment the structure can be relational), is connected to a respective one of the servers 12, 14 and holds all local information which is required by any of the servers 12, 14. The stored data includes all road network information, look-up tables used to retrieve travel point information relating to journeys, geographical node information, customer information and compressed versions of road network data for use in each server 12, 14.

In addition each system database 10 also contains scheduling, timetable and pricing information on some of the possible modes of transport.

The load balancer 16 provides a buffer between the servers 12, 14 and the Internet 20 and acts to distribute service requests to the least busiest server 12, 14. This is achieved by monitoring the activity of the servers 12, 14 and when a new service request is to be allocated, selecting the server 12, 14 with the least amount of current data traffic.

Each of the servers 12, 14 comprises a front server 2 which functions to create web pages for displaying the results of the searches together with other web pages. Home pages which the user 18 accessing the system encounters first, are home pages of the web site hosted by the ISP (Internet Service Provider). The front server 22 of each server 12, 14 is directly connected to its local system database 10 for requesting and receiving database data. Also two types of routing engine are connected to the front server 22. The timetable routing engine 24 is arranged to obtain timetable information relating to locally stored timetable transport data such as for ferries, from the local system database 10. The non-timetable routing engine 26 is arranged to obtain geographical data (distance, type of road) from the local system database 10 on locally stored non-timetable transport data. Furthermore, the timetable routing engine 24 also obtains locally stored scheduling, timetable and pricing information for some of the modes of transport for presenting as results to the web users 18.

A live link 28 to the Internet 20 is also provided and connected to the front server 22. The live link 28 uses a generic web engine (not shown) which communicates with other web sites using configuration files. The web engine is also responsible for supporting Internet connections from the users 18 through the Internet 20 to the system. The physical links are through a combination of web http links using standard communications over, for example, a 2 Mbit/second high-speed link to the hosting ISP and direct ISDN connections to the desired remote locations. The web engine is configured to maintain use connections of a short time duration for each web site access from the users 18 to the system rather than holding these connections open for a long time duration. When information is to be sent between the system and the user 18, new connection are made. This has the benefit of not slowing, down the system when it is in heavy use. Furthermore, in the present embodiment, the Internet communications between the user and the system are achieved without the use of any cookies (Internet user identifying code segments).

The live link 28 enables timetable information which is not held in the local system database 10 to be accessed remotely using the Internet 20. In the present embodiment, the links are to timetabling databases of a train operator and a bus operator. These links also provide the required scheduling, timetable, pricing and availability information. The live link 28 also provides access to other sources of related information on the Internet 20 such as local guide maps and local cinema listings which may also be presented to the web user 18.

Figure 2:
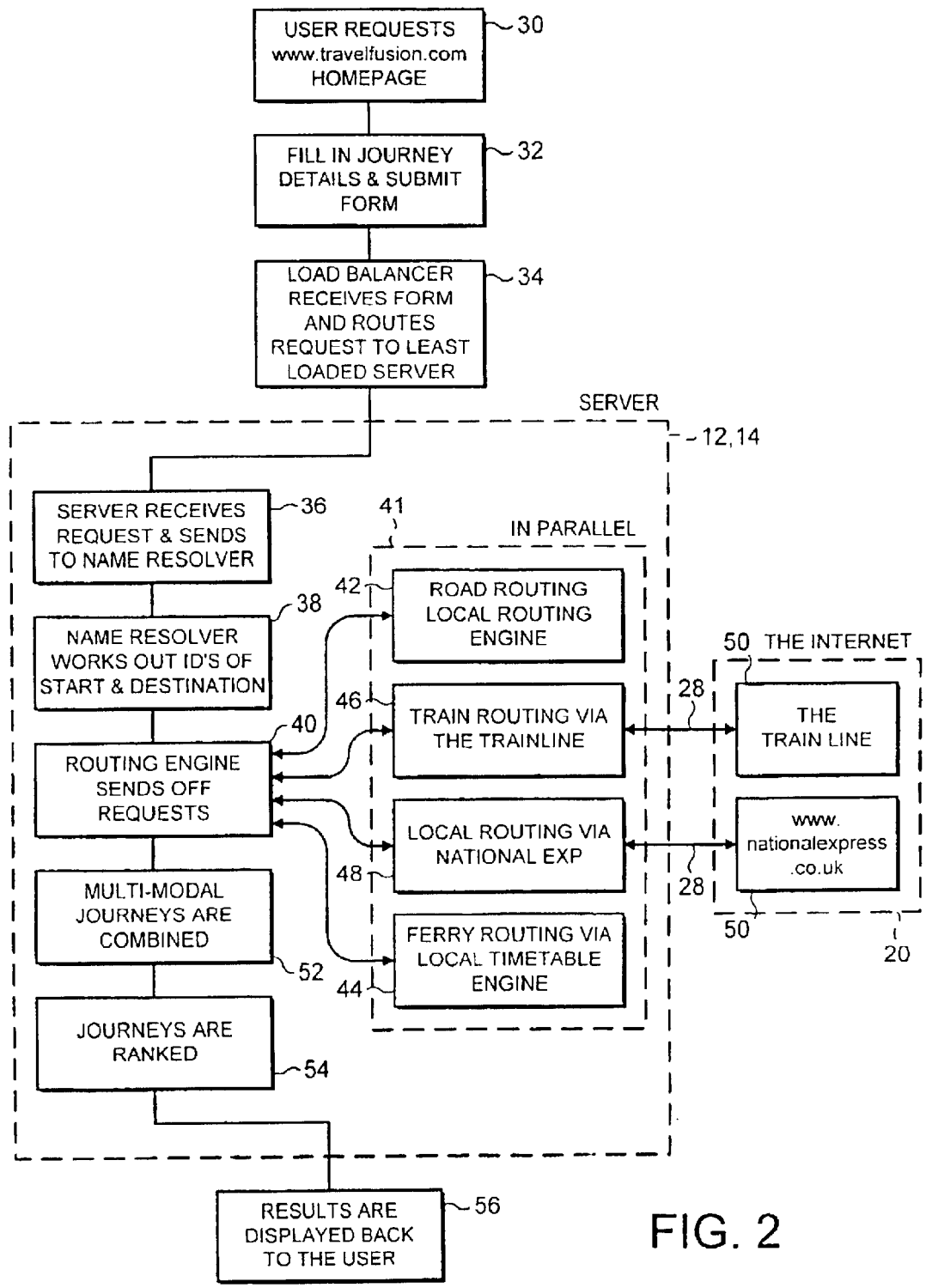
FIG. 2 is a schematic flow diagram of the method employed in operating the multi-modal travel information system shown in FIG. 1.

Referring to FIG. 2, the way in which the system operates to a typical enquiry is now described. Access to the system commences at 30 with a user 18 requesting access over the Internet 20 to the system's home page using its URL (Universal Resource Locator). In response to this, the home page is provided and from this the user 18 can access a simple enquiry entry page. In filling in this enquiry page at 32, the user 18 provides the start and end locations of the desired journey, the desired date and time of departure or of arrival, the budget for the journey, the desired mode of travel (bus, train, ferry, aircraft, road, or any combination of these) and the ranking criteria for the results such as cost, speed or most scenic route. This very basic data is all that is required from the user 18 for the multi-modal travel information system to operate. At this stage, there is no requirement for the user 18 to login or enter his or her personal identity information for identifying the user to the system.

Once complete, the form is submitted at 32 to the multi-modal travel information system. The submitted form is received at 34 from the Internet 20 by the load balancer 16 of the system. The load balancer 16 routes the request to the least loaded server 12, 14 for processing.

The operations which are carried out within the selected server 12, 14 are now described. The selected server 12, 14 receives the submitted format 36 and creates a route record for the request. The present request's route record has fields corresponding to the information contained in the submitted request form together with fields for other related predetermined data as will be described in detail later with reference to FIG. 3. As a first step, the server 12, 14 tries to identify the predetermined data associated with the submitted form data and store it in the route record. More specifically, the server 12, 14 first sends the received start and end locations of the journey to a name resolver function at 36. Here an interpreter (not shown) incorporating artificial intelligence can be used to understand the start and end locations which have been entered even if they contain spelling mistakes or other obvious errors.

The interpreter works by calculating a percentage difference score representing how close the entered name is to each entry in a list of stored place names. The percentage score is calculated by looking at the number of letters different between the entered name and the stored name, the relative closeness of the sounds produced by reciting the two names and other by looking at common misspellings. Also a ranking is carried out based on the assumption that the first letter of any incorrect name is correct. In other words, a higher weighting is given to the first letter than the others. The action taken by the name resolver function depends on the highest percentage difference score generated by the interpreter. If the highest percentage difference score is above 90% then the corresponding stored name is returned. If the highest percentage is between 90% and 40%, then a list of the most likely options (top five) is displayed for the user 18 to choose from. If the highest percentage is below 40% then the user is asked to enter the name again.

Once the name resolver function has recognised the start and end locations, their corresponding pre-stored internal identities (IDs) are recovered from a look-up table and placed into the present request's route record. These IDs are unique numbers, typically geographic co-ordinates, representing the geographical locations of the start and end locations which can now be compared and readily understood by the multi-modal travel information system. The IDs are then used to reference predetermined data sets associated with the start and end locations which enable the closest access locations to each of the transport systems and the geographic regions in which start and end locations lie to be determined. These closest access locations are then stored in the present request's route record. The purpose of this is to provide intelligent linking from the user-defined start and end points to appropriate travel network access points.

The present request's route record is then processed by a non-specific routing engine at 40. The function of the non-specific routing engine is to break down the present request's route record into a plurality of route records recursively using a route record generating algorithm until each of the plurality of route records represent a single mode of transport provided by a single service provider (such as P&O/Stena™ for ferries) between its start and end locations. Each new route record which is created represents a segment of the original user-defined journey and accordingly contains new start and end locations. However, these segments can be linked up to represent the original journey between the original start to end locations. The specific way in which the recursive route record generating algorithm is carried out is described in detail later.

Once the required route records have been created, they are sent off to specific routing engines. Routing for different route records having the same start and end locations is carried out in parallel at 41. In the present embodiment, the non-timetable routing engine 26 carries out the road routing function at 42 using the road network stored locally in the local system database 10. Due to the amount of data contained in this road network database and the large degrees of freedom available with road networks, the road routing function uses complex algorithms to determine the shortest time routes between the start and end locations. This is described in greater detail later. The timetable routing engine 24 carries out the ferry routing at 44 using the timetable information also stored locally in the local system database 10.

Train routing and coach routing are carried out at 46 and 48 respectively and involve making use of the live link 28 to the Internet 20. This is because the required timetable and other desired information relating to a particular service provider are not available locally in the system databases 10.

The service providers' on-line travel information databases 50 are accessed via the Internet 20 and queries are made based upon the content of the route records being processed by the train and coach routing functions 46, 48. The different protocols required to extract the desired information from each of these remote on-line databases 50 is stored in the multi-modal travel information system such that access is automatic albeit much slower that local database access.

In the present embodiment, the coach service provider's database is accessed using the standard enquiry entrance, namely via the homepage of the service provider. In this case, all of the information requested by the coach service provider is supplied by the web engine until the desired information is retrieved. However, the train service provider's database is accessed directly by the web engine using an ISDN line connection. This connection is made directly into the service provider's database which bypasses the standard Internet entrance used by most other enquiries and hence speeds up access times. This is only possible because of a prior agreement between the service provider and multi-modal travel information operator.

Each one of the specific routing functions 42, 44, 46, 48 extracts the required data, on the basis of the route record being processed, from its corresponding database 10, 50. The extracted information for each route record is placed into a corresponding results record and returned to the non-specific routing engine 40. More specifically, the results record contains journey time information as well as ranking data, such as cost data, that can be used to compare and rank the results. Each results record has fields corresponding to the extracted information and this is described in detail later with reference to FIG. 4.

The received results records, each of which represents a uni-modal journey segment of the desired journey, are then combined together at 52 to construct multi-modal journeys. The combining is carried out on the basis of the returned journey time information which is serially linked together from the start location to the end location to create a possible journey. The ranking data is also combined and accumulated each time two results records are combined. The specific details of how this is achieved is described in detail later.

Typically, there will be several different journey combinations created from this combining stage at 52 each of which represents an alternative way of travelling between the start and end locations. However, it is possible for some journeys that only a single uni-modal journey will exist and, in these cases, no combination will occur because only one route record will have been created initially.

The different journey combinations created at 52 are then ranked at 54. The ranking is carried out on the basis of the ranking data which is contained in each of the results records and which has been accumulated for each of the journey combinations.

The ranked results are then displayed back at 56 to the user 18 by being presented on an Internet results page of the multi-modal travel information system's web site. The order of displaying the possible journey options is determined in the ranking stage 54. The total cost of each different journey combination is also displayed. However, the amount of information displayed is kept to a minimum by use of icons representing each of the different modes of transport used in a particular journey option. If the user wishes to see more of the journey details, this can also be provided by selecting a particular journey option.

Once presented with the various journey options, the user 18 can select a desired journey option. In response to this, the multi-modal travel information system has the ability to create bookings with each of the service providers who are providing all or part of the selected journey. The availability of each of the journey combinations has already been checked at the time the route requests were made. Journey booking is achieved by using the live link 28 to the Internet 20 to access the on-line booking services provided by the service providers. Some of the information required to make the booking has already be determined by the routing engines 24,26 of the multi-modal travel information system. The personal information required to complete the booking enquiry is then obtained from the user 18. Alternatively, if the user 18 has used the site before, then their specific personal data which is stored in the local system database 10 is accessed by the user simply providing their user name and password, thereby speeding up the booking process. The user 18 can be asked to confirm the booking just prior to finalising it or if there are no more available spaces for a particular departure, the user 18 can be asked to confirm an alternative journey option.

Further services which are available to the user 18 include Internet links to city guides, information regarding location of route services available for any particular journey option and other information pertaining to the selected journey option such as car hire, local weather and traffic reports for example.

Figure 3:
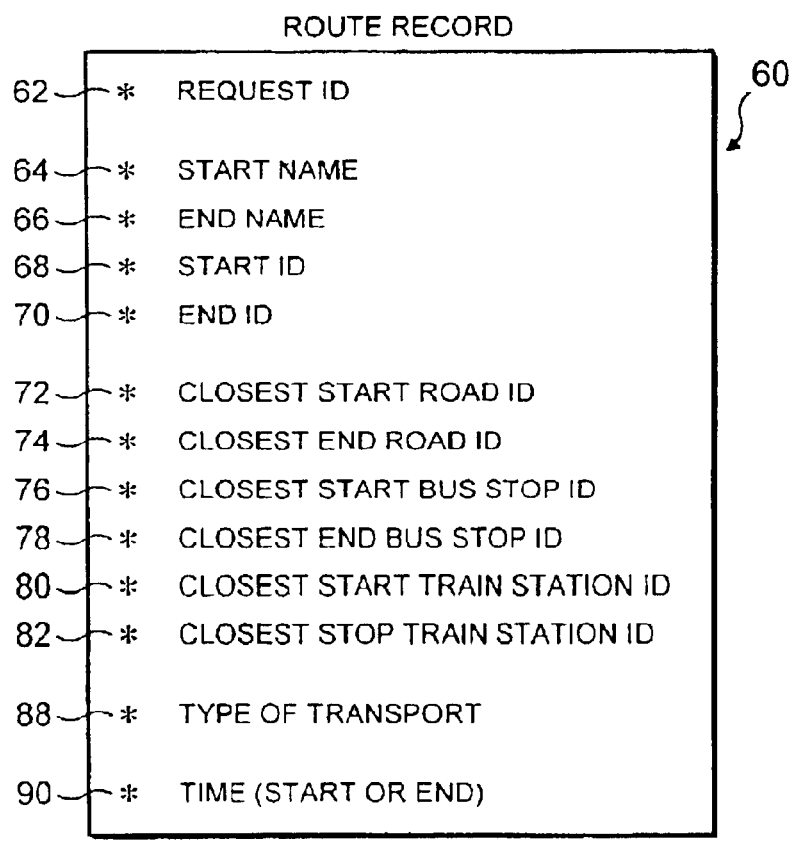
FIG. 3 is a schematic diagram of a route record used for making a request to a routing engine embodiments of the present invention.

Referring to FIG. 3, the detailed construction of a route record 60 is now described. The route record 60 contains a request ID field 62 identifying the unique identity of the route record 60. This is enables each results record to reference the corresponding route record 60 from which it is generated.

The route record 60 also contains a Start Name field 64 and an End Name field 66. These are alphanumerical string, fields which contain correct names of the start and end locations generated by the name resolver. Corresponding to these two fields are the Start ID field 68 and the End ID field 70. These two fields contain the IDs corresponding to the corrected names entered by the user 18. These IDs are recognised by the routine engines and various routine, functions such that they can be used to access relevant information stored in the local system database 10.

Next, the closest access locations to each of the available transport systems are stored in the route record 60. More specifically, the route record 60 has the following fields: closest start road field 72, closest end road field 74, closest start bus stop 76, closest end bus stop 78, closest start train station 80 and closest end train station 82. The data for these closest access location fields is stored in a look up table in the local system database 10 and referenced by way of the stored IDs.

The rest of the route record 60 stores user entered preference information. There is a group of transport fields 88 identifying any types of transport which the user 18 does not wish to use, the default condition being that all types of transport are acceptable. This field is used by the non-specific routine engine at 40 to prevent the generation of requests to any service provider using a user rejected mode of transport.

Also there is a time field 90 in the route record which stores the user's desired time and date of departure from the start location or the user's desired time and date of arrival at the end location. This field 90 is used as a reference for all of the timetable information which is obtained from the local system database 10 and the service provider's databases 50.

Figure 4:
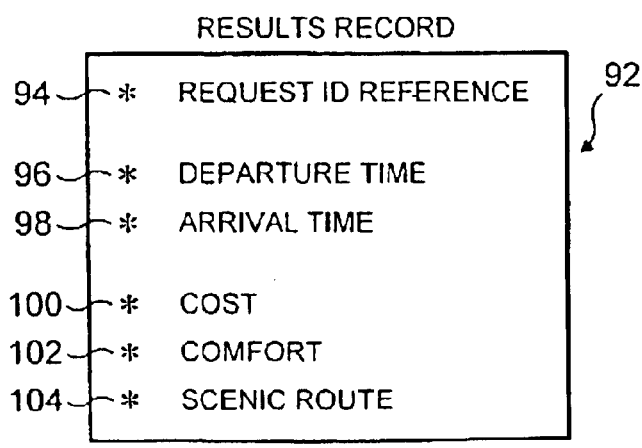
FIG. 4 is a schematic data structure representation of a results record associated with a route record shown in FIG. 3.

Referring now to FIG. 4, the results record 92 contains a Request ID Reference field 94 identifying the unique identity of the route record to which the results record 92 relates. This is enables each results record 92 to reference the corresponding route record 60 from which it is generated.

Each results record 92 has a departure time field 96 and an arrival time field 98. These two fields 96, 98 provide the essential data required for segment reconstruction to create the journey options. These fields are readily filled by timetable data. However, for non-timetable data, these times are calculated from the travelling distance between the start and the end locations and the travelling speed which can be used along the way.

The results record 92 also contains fields which help in the ranking of a journey option. A Cost field 100 provides the cost for this part of the journey as determined from the service provider for timetabled information or a pre-stored formula for cost per unit distance as dependant on speed for non-timetabled information. Two other ranking criteria fields are provided in this embodiment, a Comfort field 102 and a Scenic Route field 104. The comfort level is a points based measure of the comfort that this stage of the journey will provide for the user and can provide different results for different classes of travel (e.g. business class and economy class) on a particular journey. The Scenic Route field 104 stores a scenic level which is also a points based measure of the scenic views/stops available on any particular journey.

Having described the two data structures used for requesting and obtaining travel data, the procedure for creating the required number of route records 60 from the initial route record 60 is now described.

In the following, the term 'station' is to be understood as a geographical location contained in a database which can be directly routed from by at least one of the uni-modal routing functions, for example the ferry routing function 44. The term 'service' is to be understood as a distinct form or mode of transport, for example train, coach or ferry. The term 'service provider' is to be understood to be a distinct subdivision of a service, namely a company providing one of the services. e.g. Virgin Trains™ and Connex South Central™ are both train service providers.

The route record generating algorithm mentioned above, relies on a geographic database of Europe held in the local system database 10 being arranged in a particular manner. The geographic database is partitioned into areas of various sizes which is analogous to England being split into its counties. The size and shape of these tessellating areas has no bearing on the implementation of the route record generating algorithm, but it does have some effect on how well the algorithm works. It is also possible for these areas to be overlapping in certain circumstances.

Prior to implementing the algorithm, a look-up table is created for each and every pair of areas in the geographic database and for each service provider. The look-up table defines the major entry and egress stations between the two areas for a particular service provider if a multi-modal journey was to use the service provider for the majority of the route. For example, A multi-modal journey from London to Paris using a ferry would have at least Dover and Calais as its egress and entry stations. It is not necessary for the entry and egress stations to be provided in the two areas being compared. In the case of there being no suitable stations, this fact is recorded in the look-up table. If there are no service provider chances required to get between the two areas, then this is also recorded in the look-up table.

The algorithm is highly recursive in nature and is designed for implementation on the multi-modal travel information system which is optimised for recursion. The purpose of the algorithm is to construct geographical journey sections in a recursive fashion. The algorithm operates in two stages as set out below.

In the first stage, the algorithm starts with the initial route record 60 providing the ultimate start and end locations for the journey. For each of the route records 60 and for each of the service providers, the following recursive loop is repeated. Using the areas in which the start and end locations lie, new route records 60 are created to get from the start location to the egress station and from the entry station to the end location. These newly created route records 60 art then broken down in a similar recursive manner.

This stage of the recursive algorithm, has two possible termination conditions. The first is when the start location and the end location of a route record 60 can be satisfied by a single service provider under consideration, in which case no further decomposition of that route record 60 is required. The second condition is when the current service provider does not have any service between the start and end locations, such that the route record 60 should not be used for a transport database request.

The result of the first stage is a mass of route records 60 which represent the original route record having the original start and end locations, but in a geographically decomposed and distributed format. Having created these route records 60 on the basis of their geographical locations, their timing information needs to be considered before they can be sent to the specific routing functions 42, 44, 46, 48.

The second stage comprises controlling the transmission for the route records 60 created in the first stage of the algorithm in order specify the arrival or departure times for each of the new route records 60. Assuming that the desired time of departure from the original start location is specified by the user 18, then each of the route records 60 having the original start location in its start ID field can be sent off to the specific routing functions 42, 44, 46, 48. The way in which this is carried out is for all of the route records 60 in a first stage, from the original start location to a first intermediate egress station, are sent off in parallel to the routing functions. The specific routing functions 42, 44, 46, 48 then return the arrival times in results records 92 corresponding to each of the sent route records 60. The arrival times from the results records 92 of the first stage are used as departure times for a second stage in which route records 60 from the first intermediate egress station to a second intermediate egress station are grouped together. The route records 92 in this second stage are then all sent off in parallel to the specific routing functions 42, 44, 46, 48. This procedure is repeated until the last of the route records created by the first stage is sent off. This last route record specifies as its end location the original end location, thereby completing the journey.

The above procedure can also be carried out in reverse if the desired time of arrival is specified by the user 18 rather that the time of departure. What is important is that using one known time the routing engines can be supplied with time specific requests for information.

The procedure, mentioned previously with reference to FIG. 2, for combining together the results records 92 received from the specific routing functions 42, 44, 46, 48 to create the journey options for the user 18 is now described. This procedure is essentially the reverse of the recursive breakdown procedure used in the above described route record generating algorithm.

As described above, the results records 92 are received in batches sequentially stage by stage. The first results records 92 to be received relate to either a stage commencing with the original start location or finishing with the original end location. These results records 92, relating to the current stage of the journey, are recursively combined together by reference to each of their corresponding route records 60 which store the geographical information concerning the journey segment to which the results relate. Furthermore, as the route records have been sent to the routing engines on a sequential journey time basis to filter out irrelevant timetable data, the received results records need only be combined geographically in order to provide all the possible journey options to the user. The ranking data for each results record 92 is combined and accumulated together each time two results records 92 are combined.

The above recursive combining procedure is carried out on a stage by stage basis until all of the results records 92 have been combined. There can be many overall journey options generated from all of the results but only the most relevant which have been ranked are displayed at 56 to the user 18.

The non-timetable routing engine 26 for use with the road routine function 42 is now described in detail. The local system database 10 stores a geographical database (not shown) representing a detailed map of Europe. This database is derived from raw geographical data which is simple, purchased from geographic data vendors. The raw data is supplied in a standard format with data stored as segments and without any connection or junction information. This raw data is adapted by a one-off procedure which converts the segmented data into node data of the geographical database where each node knows which nodes it is connected to and each node knows where its nearest motorway (highway/autobahn) is. The nodes need not only be provided at road junctions, they can be provided as way points along a road to keep the resolution of the representation high and thereby increase its accuracy.

The geographical database comprises millions of node records, each of which represents a unique geographical location in the map of Europe. Each node record stores the co-ordinates of its geographical location and also stores information relating to its neighbouring nodes (representing neighbouring geographical locations) to which it is connected. By this representation, the relative position of a node can always be determined. Also each node stores information identifying where its nearest motorway is. A detailed description of a node record's data structure is now given with reference to FIGS. 5a and 5b.

Figure 5A:
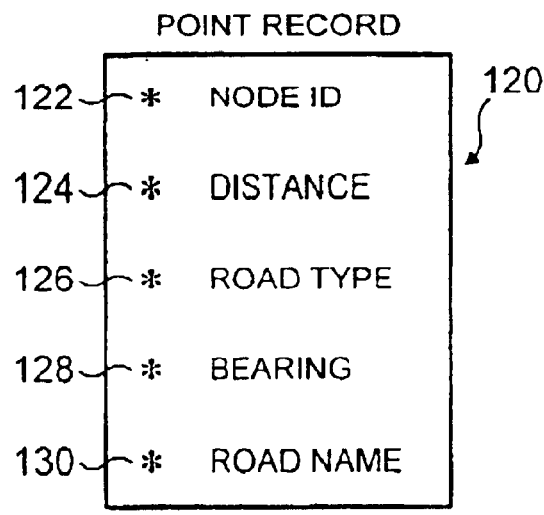
FIGS. 5a and 5b are a schematic data structure representations of a point record and a node record of a geographical database used in the embodiments of the present invention.
Figure 5B:
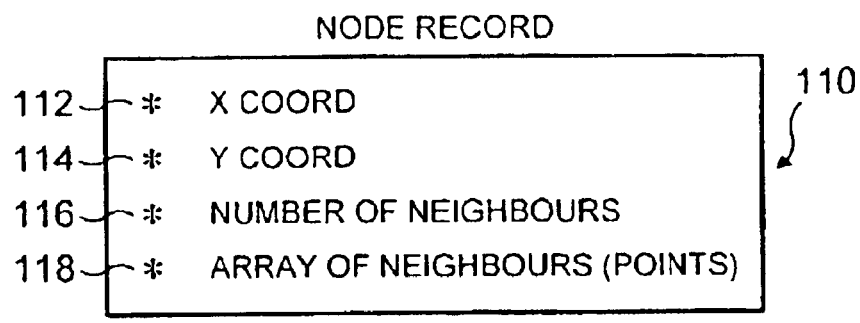

FIG. 5b shows the structure of a node record 110. The node record 110 has an X coordinate field 112 and a Y co-ordinate field 114 for storing the X and Y geographical coordinates of the position of the node. The node record 110 also has a number of nearest neighbours field 116 and an array 118 of point records 120. Each point record 120 represents information regarding one of the nearest neighbours to which the node is connected by a road.

FIG. 5a shows the structure of a point record 120. The point record 120 contains a node ID field 122 for identifying the node, a distance field 124 representing the travelling distance between the node and this neighbouring node, a road type field 126 indicating the type of road between the node and this neighbour, a bearing field 128 indicating the compass direction of the neighbour from the node, and a road name field 130 storing the name of the road between the node and this neighbour.

The bearing field 128 takes a number between one and seven and is effectively a value representing a segment approximation of a compass reading. (The 360° compass readings are approximated by seven equal segments.)

Figure 6:
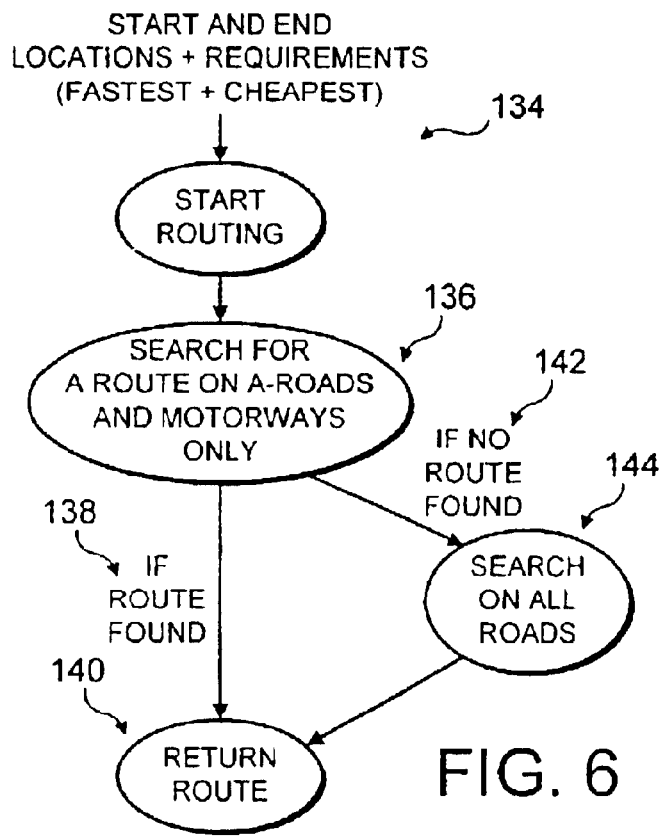
FIG. 6 is a schematic diagram of a road router algorithm used in the embodiments of the present invention.

Referring to FIG. 6, a road router algorithm 132 used by the road routing function at 42 is now described. The road router algorithm 132 commences at 134 with the provision of start and end locations together with the user's ranking criteria requirements, for example the fastest route, the cheapest route or the most scenic route.

Assuming the requirement is for the fastest route which is by far the most common requirement, the algorithm 132 continues with a search first being carried out at 136 using only motorways and A-roads. The reason for imposing such a restriction is because this is one of the quickest ways of determining the fastest route from the start to the end locations. If a route is found at 138 from the start to the finish locations only using motorways and A-roads, then the found route is returned at 140. If no route is found at 142, then a slower more detailed search is carried out at 144 of all the roads in the geographical database. Once a route is found, this is returned at 140.

In the present algorithms, each type of road has a given speed associated with it which is essential in determining the time cost for using this road. For example, it is assumed that the speed for motorway travel is 70 mph. for A-roads 50 mph and for B-roads 30 mph. Given the distance between nodes and the speed of travel, an arrival time can be calculated for any departure time. It is to be appreciated that the most direct route from the start to end locations may not necessarily be the quickest.

The specific algorithm used to carry out the search of the geographical database is now described with reference to FIG. 7. The search technique used in the present embodiment is a depth first recursive search which is arranged to carry out an exhaustive search. A depth first recursive search is simply a way of biasing the selection of the next node to be checked such that a route between the start and end locations, no matter how long it is, is found quickly. Then the rest of the algorithm is spent in back tracking, optimising and pruning that route until the optimum route is obtained as is described below.

In the first stage of the search, the direct compass direction between the start and end nodes is determined. This is simply achieved by a comparison of start and end location co-ordinates. Then the appropriate compass direction segment is determined and used in selecting the first neighbouring node of the start location node which is to be searched. This first neighbouring node, which becomes the search node, is the closest in its relative compass direction to the calculated compass direction. A check is then made to see if this is the end node. If not then the search node moves onto the next neighbouring node which is closest to the compass direction of the end node. This is an exhaustive procedure which is repeated recursively until a route to the end node is determined. The route to the end node which is determined in this way is stored as the current best route.

Figure 7:
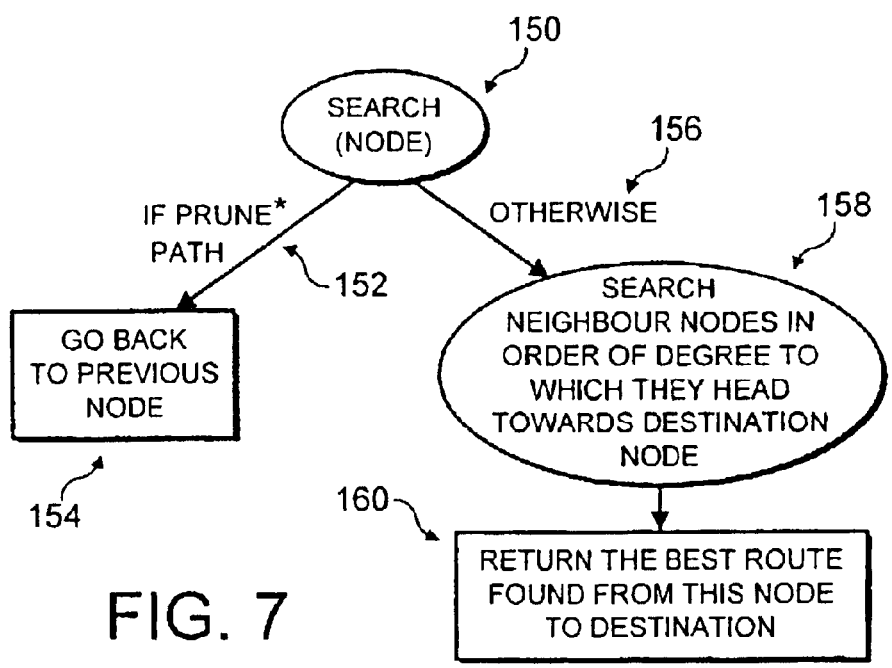
FIG. 7 is a schematic diagram of a search algorithm used in a road routing search when pruning a route established by a depth first recursive algorithm employed in the embodiments of the present invention.

The next stage involves backtracking and pruning the current best route established between the start and end nodes as shown in FIG. 7. More specifically, the node immediately preceding the end node in the current best route is made the current search node at 150. Then a check is made as whether to prune the path between the current node and the previous search node. If the result of the pruning check is to prune the path at 152, then the previous node in the current best route is made the new search node. However, if the result of the pruning check is not to prune at 156, then a search of neighbour nodes at 158 is carried out in order of the degree to which they head towards the end node. At the end of this search, the best route found from all the neighbour nodes to the end node is selected and returned at 160 as the new partial route to the end node. This procedure is repeated recursively until the new search node becomes the start node.

The specific method of pruning used in the above search algorithm is now described. Taking the current search node, a hypothetical route from the start to the end node is calculated. The hypothetical route takes the current best route from the start node to the current search node and then a direct (hypothetical) motorway connection from the current search node to the end node. The total time/cost for this hypothetical route is calculated. If the time/cost of the hypothetical route i, worse than that of the current best route, then the path is pruned.

In a second embodiment of the present invention, the method of pruning can be enhanced by use of pre-stored information. More specifically, a more accurate hypothetical route can be found by using the pre-stored distance at each current search node to its nearest motorway and assuming a direct A-road exists between the current search node and the motorway. This is a more accurate measure because it better relates the hypothetical routing to the real stored information about the road network.

In a third embodiment of the present invention the two-stage route record generating algorithm which uses both serial batch in its second stage enquiries is replaced with a purely recursive interleaved algorithm. Once a layer of subdivisions have been created, any subdivisions which need not be subdivided further are sent off in parallel to their specific routine functions 42, 44, 46, 48. This procedure is recursively repeated until no further requests are left to send off. The timing information in each request is generated by way of an estimate. The estimate can be determined by a function which has a predetermined knowledge of approximate times taken to get between given stations for a particular mode of transport. Using these estimates in place of returned results data significantly speeds up the process of sending off the requests such that the user is presented with the journey options in a faster manner.

A fourth embodiment of the present invention is now described with reference to FIGS. 8 and 9. The fourth embodiment is similar in many respects to the first embodiment and so only the differences will be described hereinafter to avoid unnecessary repetition.

One of the main differences between the fourth embodiment and the first embodiment is that the system is configured, in addition to providing multi-modal comparative travel information, to provide uni-modal comparative travel information to the user. Contrary to the prior art systems, this aspect of the present system is a point-to-point service that determines the most suitable combinations of transport network access points in relation to user-defined start and end points for a given journey. The suitability of a particular service provider is determined on the ability of that service provider to be able to satisfy the user preferences, or the default preference of shortest journey time.

To achieve this, the service provider's route network is overlaid onto the geographic database thus allowing the most suitable pair of start and end access points to be found. The suitability of a pair of access points is a function of: the distance from the user's start location to the selected transport network entry point (access point), the distance from the user's requested destination and the selected transport network egress point (access point), and the total journey distance which weights the possible results such that for short journeys there is more weighting on the above mentioned distances but on the longer journeys there is less. However, other factors may also be used in determining the suitability of a pair of points such as route cost, or the route travelling time between the start and end locations and the respective access points. Note that this latter factor is often different from the shortest distance factor.

The present embodiment does not treat the access points as symbolic names, but rather as geographic location references. This in itself allows a far more powerful/useful service to be presented, i.e. a user need not know information about the transport networks of service providers, they simply need to know where they are and where they wish to get to. Combining this geo-spatial knowledge of the transport network with the knowledge of the transport providers capabilities (for example which combinations of entry/egress points are serviced) provides superior uni-modal point-to-point journey planning.

Figure 8:
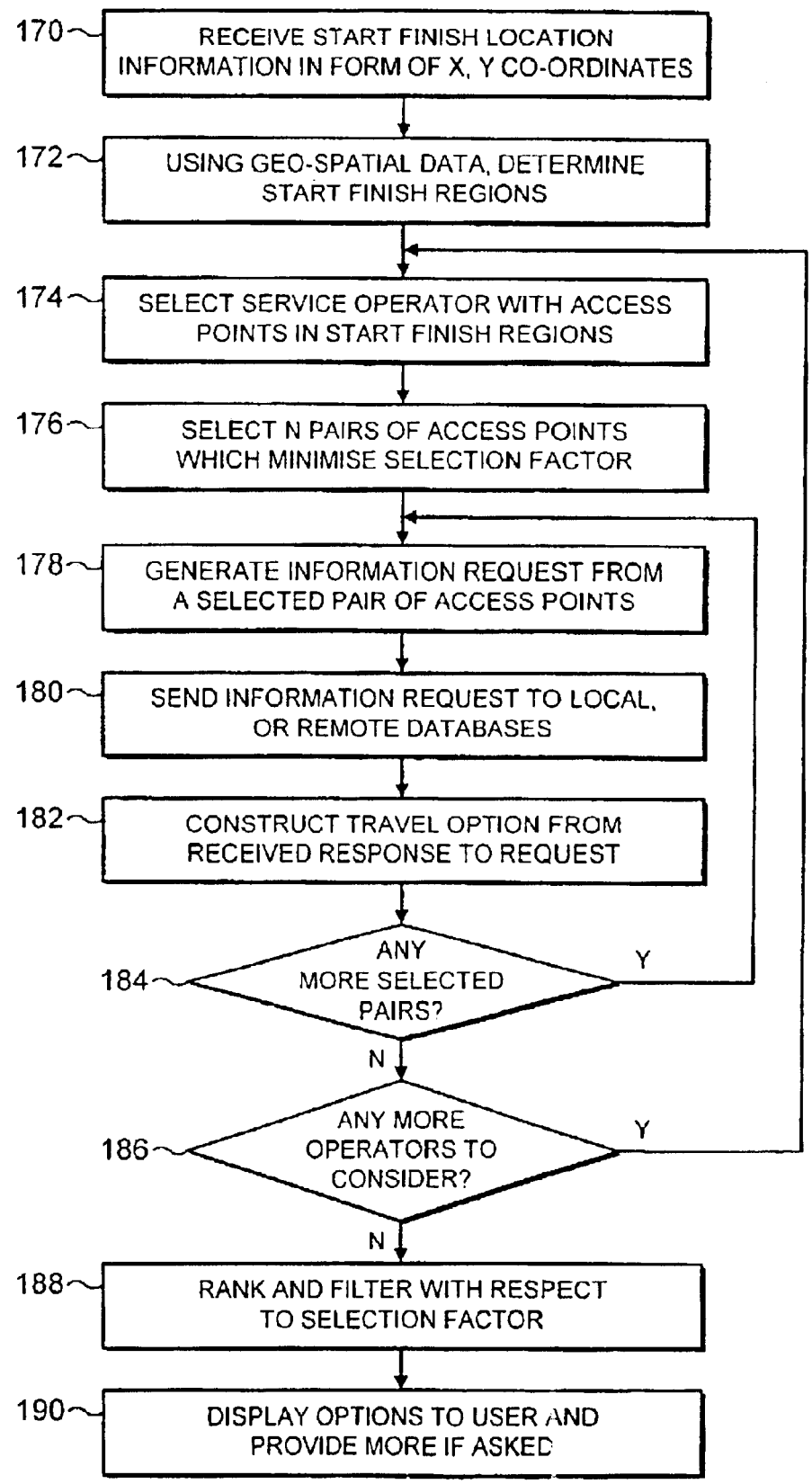
FIG. 8 is a schematic flow diagram of the operation of an enhanced uni-modal aspect of a travel information system according to a fourth embodiment of the present invention.

Referring now to FIG. 8, a method employed in the present embodiment of determining the uni-modal navigation information is now described in detail, the method commences with the reception at 170 of start and finish location information in the form of X, Y co-ordinates. There are various ways in which the co-ordinate format data is obtained from the user and this is described in detail below with respect to FIG. 9. These co-ordinates are then compared at 172 against geo-spatial data stored in the system database 10 and the predetermined geographic regions within which the start and finish locations are situated are found and retrieved.

The system then selects 174 for a given mode of transport, a service operator with access points in the start and finish regions. For that given service provider, n (an integer) pairs of access points are selected at 176 which minimise a selection factor. The different types of possible user defined selection factors have been mentioned previously, but for this example it is assumed that the factor is distance. Accordingly, n pairs of access points which are closest to the user-defined start and end locations are selected as potential optimum routes.

For a selected pair of access points, an information request is generated at 178 in a similar manner to that of the first embodiment. The information request is sent at 180 to local or remote databases, depending on where the given service provider has their travel information stored. The request is processed and a response is generated from the database to which the request was sent. On receipt of the response at 182, a travel option is constructed. Here, if the user specified timing information, then the travel option would include the best timetabled service to meet the user specified departure or arrival time.

The method then determines at 184 whether there are any further pairs of the n selected pairs which also need to be processed to determine their own travel options. If there are, then the above described process steps from generating at 178 an information request to constructing a travel option 182 are repeated for the new pair of access points. This entire process is repeatedly carried out until there are no further selected access points. Then the system determines at 186 whether there are any further service operators to consider. If there are, then the above described processes from selecting at 174 a new service operator to constructing at 182 a travel option for each selected access pair of the service operator, are repeated. However, if there are no further service operators to consider, then the constructed travel options are ranked and filtered at 188 with respect to the selection factor. An ordered list of travel options is then displayed at 190 to the user typically with a limited number of options being displayed at any given one time. This enables the most relevant travel options to be presented to the user first to assist in ease of user selection. More listed options of lower ranking in the list are provided at 190 if asked for by the user.

Another difference of the present embodiment over the previous one is that the start and end locations do not have to be entered by the user. Rather, in a mobile application, positional data relating to where the user has been or where they are at present can be used as the start and end locations.

This procedure does not always require the user to actually enter in information regarding these locations. However, a location determining mode does need to be selected. For example, the user may selected a mode where the current location of the user is taken to be the start position and the user is only required to enter the end location as in the first embodiment. Another selectable mode is where the current location of the user is taken to be the start position and a previously stored positional location at which the user has been is used as the end location. In this case, the user does not specifically have to input location data because the selection of this mode simply determines the start and end points automatically. The way in which the user's current or previously stored location can be used with the other parts of the system is now described.

Figure 9:
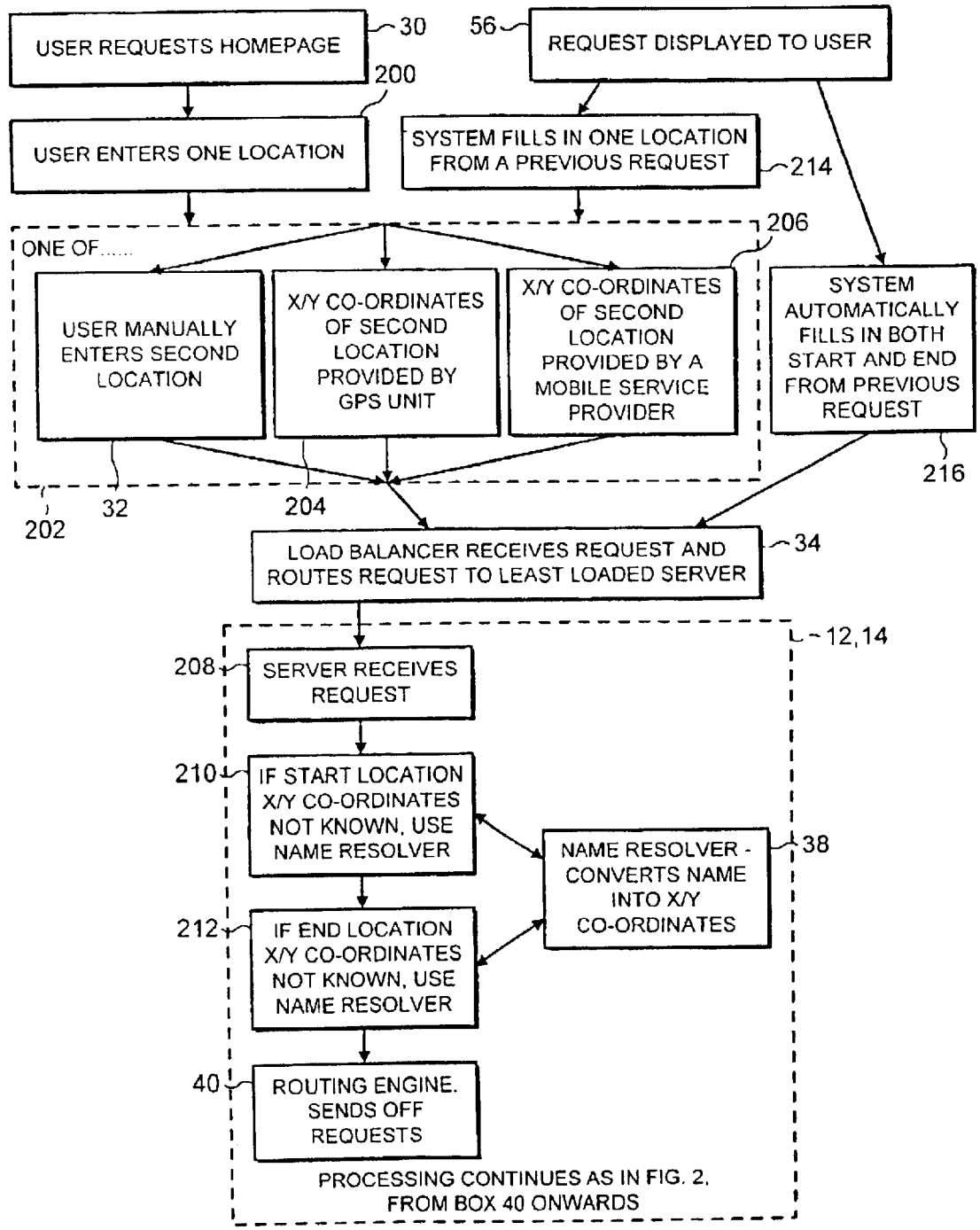
FIG. 9 is a schematic flow diagram of a modification to the method illustrated in FIG. 2 employed in operating the travel information system of the fourth embodiment.

Referring now to FIG. 9, a modification of FIG. 2 is provided to illustrate the different ways in which the X/Y co-ordinates (geographic latitude and longitude) can be obtained for mobile user. In a similar manner to that shown in FIG. 2, the user starts the process by requesting a home page at 30. On reaching the web site, the user enters one location at 200, either a start or an end point of the user's desired journey. There are then three different options at 202 for obtaining the second location the other of the start or end point of the journey. The first option is as in the first embodiment, for the user to enter the second location manually, at 32. The second option is for the X/Y co-ordinate of the second location to be provided at 204 by a GPS (Global Positioning Satellite) unit. The third option is for the X/Y co-ordinate of the second location to be provided at 206 by a mobile service provider who is handling the users mobile communications.

The load balancer 16 then receives the request at 34 and routes it to the least loaded server 12, 14 as in the first embodiment. At the server 12, 14 the request is received at 208 and analysed as to its contents. If the start location X/Y co-ordinates are not known at 210 then the start location must be in the form of a name and accordingly, the name of the start location is sent to the Name Resolver. The Name Resolver converts at 38 the name of the start location into the required X/Y co-ordinates and these are then returned.

Similarly, the end location information is checked at 212 and if the end location X/Y co-ordinates are not known at 212 then the end location must be in the form of a name. Accordingly, the name of the end location is then sent to the Name Resolver, which converts at 38 this end location name into the required X/Y co-ordinates. The Name Resolver then returns these co-ordinates for further processing.

Subsequently the routing engine 24, 26 having received the required co-ordinates of the start and end locations in the form of X/Y co-ordinates, compiles a request and sends this off at 40 as described in the first embodiment.

It is also to be appreciated that the present embodiment enables fast editing of previous requests by users to elicit new information. This starts from a previous request being displayed to the user at 56, the system then takes one of two different paths. In the first path, the system fills in one of the required start or end locations at 214 from the previous request and then goes onto the one of the three possible options at 202 previously described. Alternatively, in the second possible path, the system automatically fills in both the start and end locations from the previous request at 216. This latter path is taken when the user wants to maintain the current start and end locations but wants to change one of the other user preferences. For example previously the fastest journey options could have been required and now the cheapest journey options are required for the same journey.

The result of taking either one of the two paths is that the request is forwarded as before to the load balancer 16 and processed as has been described above.

It is to be appreciated that there are many possible user preferences, such as cost of travel via desired points, use of specified travel companies or operators, most scenic route which can be entered into the system and which will determine the options presented to the user.

A further difference between the present embodiment and the previous embodiment is that airport information provided at remote on-line airline databases is accessible to the routing engines. The airline information is obtained in a similar manner to that described in relation to the train routing information, namely via Internet, however, in this case there are multiple different airline sites which are connected to each providing information on scheduling, fares, availability and even allowing direct booking to be made.

A further difference is that the present embodiment is also linked via the Internet to an on-line booking site such as e-bookers.com. This connection advantageously enables bookings to be made once a particular journey has been selected if the facilities are not available to book through the information providing sites themselves. Furthermore, the booking site can also provide a further mine of information for use in determining alternative travel service providers, such as alternative airlines.

The fourth embodiment of the present invention, also has a different Name Resolver (Location Resolver) to that described in the first embodiment. In particular, the revised Name Resolver has an ability to provide the best guess at the desired location because of its unique interaction of word correction and geographical demographic information ranking, as is described in detail below.

The Location Resolver is designed for finding any location in the world using intelligence to allow for human factors, such as spelling and language. The Location Resolver also uses certain techniques to make it fast, which is vital for a service which allows for a heavy user load such as that of a popular website.

The Location Resolver takes a name from the user at 38 and returns a list of the most likely locations desired. The name (city, province, country) and world co-ordinates (longitude, latitude) are given for each location returned. The locations returned are ordered by the most likely desired.

The Location Resolver firstly finds the location by passing the received name through each of the following modules:

i) Spell checker

If the name given by the user does not match exactly to any names in the database then the spell checker will find the closest names to the user's spelling, e.g. 'Lundon' resolves to 'London'.

ii) Translator

A name may be specified in any language (assuming that the translation is provided in the data). For example, if a French person asks for 'Londres' then they will get the location of London. This is simply done by having foreign language equivalents in each database record of the known locations in English.

iii) Whole word matching

A name given as a single word will be matched to all names containing that word. For example, 'Newcastle' resolves to 'Newcastle-upon-Tyne'.

iv) Alternative name matching

Any number of alternative names may be given to a particular location. For example, the Europe data used by the present embodiment does not contain the names of islands, so these have been added as alternative names. For example 'Corfu' resolves to the location of Kerkira (the main city in Corfu).

Once the possible locations that the user entered name may relate to have been found, then these possible names are ordered into a results list. This is carried out on the basis of demographic geographical data which is obtained from a geographical database. More specifically, the population size of a named location is considered when ordering the resulting list of choices given to the user. This is done on the assumption that the larger the location is, the more likely it is to be the one desired.

The way in which the Location Resolver works is to use the well known 'Binary Chop' search algorithm for finding the closest known location names to that input by the user. In this case all locations are required to be sorted alphabetically to find exact matches. The time taken to perform the Binary Chop algorithm is negligible.

Another point to note is that a first letter indexing technique is used in the Location Resolver. The spell checker only checks names beginning with the same first letter. Using this method, spell checking takes an average of about $1/10^{th}$ of the time it would otherwise.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims. For example, the geographical database need not be restricted to Europe but can be one of the whole world. Also, the above described multi-modal travel information system can be readily adapted to provide air travel information, with the airports in a particular region acting as entry and egress stations between two areas.

It is also possible to alter the road routing algorithm to carry out a non-exhaustive search. In this case, some predefined function is applied to each of the original possibilities to intelligently filter out unlikely branches of the recursion. In this way early pruning of the search branches can advantageously carried out thereby making the route determination faster.

What is claimed is:

1. A method of providing journey information to a user, the method comprising:
    receiving unique location reference information identifying the start and end locations of a user-defined journey;
    considering at least some possible predetermined pairs of access points to a transport network of a single mode of transport, the access points being at different locations than the start and end locations;
    selecting those pairs of access points which minimize a selection factor between the start and end locations and the access points respectively;
    generating an information request containing a selected pair of access points and sending the request to a knowledge store holding information regarding the single mode of transport;
    receiving multiple different responses representing different travel options from the knowledge store;
    constructing comparative multiple travel options for the user-specified journey from the response received from the knowledge store; and
    providing all the comparative multiple travel options to the user on a single viewing page for ease of comparison and user selection.

2. A method according to claim 1, wherein the selection factor comprises one of the group comprising: a route cost; a route distance; and a route traveling time between the access points and the start and end locations.

3. A method according to claim 2, wherein the selection factor is weighted by consideration of the distance of the user-defined journey.

4. A method according to claim 1, wherein the considering step comprises for a given service operator considering only those pairs of access points which are available as part of the service operator's network service.

5. A method according to 1, wherein the unique location reference is a unique co-ordinate position of the location.

6. A method according to claim 1, wherein the unique location reference information comprises a user recognizable identifier name of a location.

7. A method according to claim 1, wherein the considering step comprises identifying respective start and end geographic regions within which the start and end locations are present, and considering only those pairs of access points provided within these regions.

8. A method according to claim 7, wherein the regions are non-overlapping.

9. A method according to claim 1, further comprising determining the unique location reference information from user-specified start and end location names.

10. A method according to claim 9, wherein the determining step comprises interpreting the user-entered location names by finding the closest matches to pre-stored location names have predetermined unique location references for use with the receiving step.

11. A method according to claim 9, further comprising noting one of the group comprising: a user-specified departure time from the start location; and a user-specified arrival time for the end location, and providing this noted time information in the information request.

12. A method according to claim 9, wherein the determining step is carried out via a mobile telecommunications device.

13. A method according to claim 1, further comprising determining the unique location reference information from a user-specified location name and from an automatic current location of user determining procedure.

14. A method according to claim 13, wherein the automatic user current location determining procedure comprises automatically determining a current unique geographic location reference of the user by using radio transmission techniques for the subsequent receiving step.

15. A method according to claim 13, wherein the determining step comprises interpreting a user-entered location name by finding the closest match to pre-stored location names having predetermined location co-ordinates for use with the receiving step.

16. A method according to claim 14, wherein the automatically determining step is carried out via a mobile telecommunications device.

17. A method according to claim 16, wherein the automatically determining step is carried out using a Wireless Application Protocol.

18. A computer-readable medium/electrical carrier signal encoded with a program for causing a computer to perform the method of claim 14.

19. A method according to claim 1, wherein multiple different responses representing different travel options are received from the knowledge store and the constructing step comprises constructing comparative multiple travel options for the user-specified journey for user comparison.

20. A method according to claim 19, wherein the multiple travel options are ranked according to a user-defined criterion.

21. A method according to claim 20, wherein the user-defined criterion is selected from the group comprising: cost of the journey, speed of the journey; closeness to user-specified departure time; and closeness to user-specified arrival time.

22. A system for providing journey information to a user, the system comprising:
   input means for receiving unique location reference information identifying the start and end locations of a user-defined journey;
   means for considering at least some possible predetermined pairs of access points to a transport network of a single mode of transport, the access points being at different locations than the start and end locations;
   selection means for selecting those pairs of access points which minimize a selection factor between the start and end locations and the access points respectively;
   requesting means for generating an information request containing a selected pair of access points and sending the request to a knowledge store holding information regarding the single mode of transport;
   receiving means for receiving multiple different responses representing different travel options from the knowledge store;
   constructing means for constructing a travel option for the user specified journey from the response received from the knowledge store; and
   means for providing all the comparative multiple travel options to the user on a single viewing page for ease of comparison and user selection.

23. A method of determining a unique location reference from user-specified location name, the method comprising:
   reading a user-specified location name;
   interpreting the user-specified location name by finding the closest matches thereto from pre-stored location names having predetermined unique location references associated therewith;
   accessing demographic data regarding the closest matches from a geographic/demographic database of the predetermined location references; and
   ranking the closest matches in order of the demographic size of each possible match.

24. An integrated journey planner for providing travel information for a user-specified journey; the journey planner comprising:
   means for deconstructing a user enquiry specifying the journey into a plurality of information requests, each specifying a part of the journey using a single mode of transport;
   means for sending each request to an appropriate one of a plurality of knowledge stores, each store holding travel information regarding a different mode of transport;
   means for reconstructing the responses to the requests received from the plurality of knowledge stores into at least one multi-modal travel option, for the user-specified journey, incorporating different modes of transport;
   means for displaying travel options determined by the journey planner to the user; and
   means for expanding the travel options provided to the user for the purposes of travel option comparison.

25. An integrated journey planner according to claim 24, wherein the user enquiry includes time information specifying one of the group comprising the desired departure time for the journey and the desired arrival time.

26. An integrated journey planner according to claim 25, wherein the user enquiry includes user preference information for use in ranking or filtering a plurality of multi-modal transport options.

27. An integrated journey planner according to claim 24, wherein the user enquiry includes user preference information for use in ranking or filtering a plurality of multi-modal transport options.

28. An integrated journey planner according to claim 24, wherein the user preference information comprises one of the group comprising fastest journey information, cheapest journey information, most comfortable journey information and most scenic journey information.

29. An integrated journey planner according to claim 24, wherein the user preference information includes preferred modes of transport information.

30. An integrated journey planner according to claim 24, further comprising a user enquiry processing means for understanding and linking the enquiry to associated locally stored data.

31. An integrated journey planner according to claim 24, further comprising an assignment means for assigning pre-stored data to a data record representing the user enquiry, the pre-stored data being associated with the user-specified journey.

32. An integrated journey planner according to claim 31, wherein the assignment means is arranged to assign to the start and end points of the user-specified journey, the closest known access points to a transport network for each mode of transport.

33. An integrated journey planner according to claim 24, wherein the deconstruction means is arranged to estimate, using pre-stored information relating to user-defined start/end time and a geographic subdivision, a start/end time result for any subdivision.

34. An integrated journey planner according to claim 24, wherein the deconstruction means is arranged to create requests specifying that travel information pertaining only to currently available routes is provided for each of the responses.

35. An integrated journey planner according to claim 24, further comprising a road routing engine for searching stored road data representing a road network to return a route best meeting a user defined criteria.

36. An integrated journey planner according to claim 35, wherein the road routing engine is arranged to implement a depth first recursive search for a road route over at least a subdivision of the user-specified journey, and to recursively optimise an initially found route in accordance with user-specified criteria.

37. An integrated journey planner according to claim 36, wherein the user-specified criteria includes minimum journey time.

38. An integrated journey planner according to claim 24, wherein each of the plurality of knowledge stores comprises either timetable and fare information for a service provider or journey time and distance information for a road route.

39. An integrated journey planner according to claim 24, wherein the plurality of knowledge stores are provided on a single data storage device.

40. An integrated journey planner according to claim 24, wherein at least one of the plurality of knowledge stores comprises a remote database accessible via a communications network and the sending means is arranged to transmit some of the requests to this remote database.

41. An integrated journey planner according to claim 40, wherein the communications network comprises the Internet.

42. An integrated journey planner according to claim 24, wherein at least some of the generated responses include travel time information obtained from timetables and the reconstructing means is arranged to accumulate the timetable information for each travel option.

43. An integrated journey planner according to claim 24, wherein at least some of the generated responses to a user enquiry include travel time information not obtained from timetables and the reconstructing means is arranged to accumulate the travel time information for each travel option.

44. An integrated journey planner according to claim 24, wherein the reconstructing means is arranged to accumulate ranking information for each travel option returned from each of the responses.

45. An integrated journey planner according to claim 44, wherein the ranking information accumulated by the reconstructing means includes price information.

46. An integrated journey planner according to claim 44, further comprising means for ranking each of the travel options using the accumulated ranking information and user-selected ranking criteria.

47. A method of determining a route between start and end map locations, the method comprising:
   searching a network of nodes, representing road data at a plurality of geographic road locations and neighboring locations, in a recursive manner to establish a route between the nodes representing the start and the end locations; and
   traversing the selected route from the end node to the start node in order to optimise the route selection along the route from each intermediate node to the end node,
   wherein the traversing/optimising step comprises for each intermediate node calculating a hypothetical route from the start to the end node and comparing it with the selected route, the hypothetical route being identical to the selected route from the start to the current intermediate node and including a partial hypothetical route from the current intermediate node to the end node, the partial hypothetical route being an ideal route maximising a user-defined criterion.

48. A method according to claim 47, wherein the searching step comprises recursing the network of nodes using a depth first recursive technique.

49. A method according to claim 47, wherein the searching step comprises recursing the network of nodes using an exhaustive search technique.

50. A method according to claim 47, wherein the searching step comprises selecting the next neighboring node to be searched on the basis of geographic bearing information between the start and end nodes.

51. A method according to claim 47, wherein the user-defined criterion is fastest road route and the ideal route is an idealised freeway/highway link.

52. A method according to claim 47, wherein the traversing/optimising step comprises pruning a partial route if the comparison shows the hypothetical route to be worse in terms of the user-defined criterion than the selected route and moving the current intermediate node to the next intermediate node in the selected route.

53. A method according to claim 52, wherein the traversing/optimising step comprises searching all neighboring nodes to the current intermediate node and selecting the node with the best route to the end node in terms of the user-defined criterion.

54. A method according to claim 53, wherein the step of searching the neighboring nodes is carried out in order of the degree to which each heads towards the end node.

55. A method according to claim 47, further comprising creating the network of nodes representing road data at a plurality of geographic road locations, each node storing information about its neighboring nodes.

56. A method according to claim 55, wherein the stored information in each node comprises geographic position information and distance of each neighbor information.

57. A method according to claim 56, wherein the stored information in each node further comprises information relating to the type of road connection between each neighbor.

58. A method according to claim 47, further comprising the step of calculating the distance of a traversed/optimised route between the start and end nodes.

59. A method according to claim 47, further comprising the step of calculating the time taken to travel between the start and end nodes using the optimised route.

60. A method according to claim 59, wherein the time calculating step includes using pre-stored speed data relating to the type of road used.

61. A road network routing engine for determining a route between start and end map locations, the routing engine comprising:
   a search engine for searching a network of nodes, representing road data at a plurality of geographic road locations and neighboring locations, in a recursive manner to establish a route between the nodes representing the start and the end locations;
   optimising means for traversing the selected route from the end node to the start node optimising the route selection along the route from each intermediate node to the end node; and
   calculating means for calculating, for each intermediate node, a hypothetical route from the start to the end node and comparing it with the selected route, the hypothetical route being identical to the selected route from the start to the current intermediate node and including a partial hypothetical route from the current intermediate node to the end node, the partial hypothetical route being an ideal route maximising a user-defined criteria.

62. An integrated journey planner for providing travel information for a user-specified journey; the journey planner comprising:
   means for deconstructing a user enquiry specifying the journey into a plurality of information requests, each specifying a part of the journey using a single mode of transport;

means for sending each request to an appropriate one of a plurality of knowledge stores, each store holding travel information regarding a different mode of transport; and means for reconstructing the responses to the requests received from the plurality of knowledge stores into at least one multi-modal travel option, for the user-specified journey, incorporating different modes of transport, wherein the deconstruction means is arranged to deconstruct each user enquiry using a recursive subdivision procedure for each possible mode of transport until for each subdivision one of the following group of conditions is met; the group comprising:

the subdivision relates only to one service provider and one mode of transport;

the subdivision relates to a continuous portion of a road network; and the mode of transport is not available for the subdivision.

63. An integrated journey planner for providing travel information for a user-specified journey; the journey planner comprising:

means for deconstructing a user enquiry specifying the journey into a plurality of information requests, each specifying a part of the journey using a single mode of transport;

means for sending each request to an appropriate one of a plurality of knowledge stores, each store holding travel information regarding a different mode of transport, wherein the sending means is arranged to send the requests to different knowledge stores in batches, each batch containing requests with a specified start or end time, the batches being sent sequentially from a user-defined time such that the start or end time results for one batch can be used as the end or start time specifications for the next batch; and means for reconstructing the responses to the requests received from the plurality of knowledge stores into at least one multi-modal travel option, for the user-specified journey, incorporating different modes of transport.

64. An integrated journey planner for providing travel information for a user-specified journey, the journey planner comprising:

means for deconstructing a user enquiry specifying the journey into a plurality of information requests, each specifying a part of the journey using a single mode of transport;

means for sending each request to an appropriate one of a plurality of knowledge stores, each store holding travel information regarding a different mode of transport;

means for reconstructing the responses to the requests received from the plurality of knowledge stores into at least one multi-modal travel option, for the user-specified journey, incorporating different modes of transport;

means for displaying travel options determined by the journey planner to the user;

means for expanding the travel option details provided to the user for the purposes of travel option comparison;

means for selecting one of the displayed travel options, and booking means receptive to the selecting means for carrying out on-line booking of any of the selected modes of transport requiring ticket purchasing; and means for obtaining information related to the selected travel option, the obtaining means being arranged to retrieve the desired information over a communications network.

65. An integrated journey planner according to claim 64, wherein the information includes one of the group comprising: weather reports; and city guides.

66. An integrated journey planner for providing travel information for a user-specified journey; the journey planner comprising:

means for deconstructing a user enquiry specifying the journey into a plurality of information requests, each specifying a part of the journey using a single mode of transport;

means for sending each request to an appropriate one of a plurality of knowledge stores, each stare holding travel information regarding a different mode of transport;

means for reconstructing the responses to the requests received from the plurality of knowledge stores into at least one multi-modal travel option, for the user-specified journey, incorporating different modes of transport;

a user enquiry processing means for understanding and linking the enquiry to associated locally stored data, wherein the processing means comprises a name resolver arranged to interpret the user-specified journey by finding the closest match of pre-stored data to the user-specified journey, and is arranged to use artificial intelligence to determine its acceptance.

67. An integrated journey planner according to claim 66, wherein the name resolver is arranged to provide a list of closest matches for user selection if the user-specified journey is sufficiently different from the closest matching pre-stored data.

68. An integrated journey planner for providing travel information for a user-specified journey; the journey planner comprising: means for deconstructing a user enquiry specifying the journey into a plurality of information requests, each specifying a part of the journey using a single mode of transport;

means for sending each request to an appropriate one of a plurality of knowledge stores, each store holding travel information regarding a different mode of transport; and means for reconstructing the responses to the requests received from the plurality of knowledge stores into at least one multi-modal travel option, for the user-specified journey, incorporating different modes of transport, wherein the deconstruction means is arranged to deconstruct each user enquiry using a recursive subdivision procedure for each possible mode of transport until for each subdivision one of the following group of conditions is met, the group comprising:

the subdivision relates only to one mode of transport; and the mode of transport is not available for the subdivision.

69. An integrated journey planner according to claim 68, wherein the deconstruction means is arranged to stop the recursive subdivision when for each subdivision one of the following group of conditions is met, the group comprising:

the subdivision relates only to one service provider and one mode of transport;

the subdivision relates to a continuous portion of a road network; and the mode of transport is not available for the subdivision.

70. An integrated journey planner according to claim 68, wherein the deconstruction means is arranged to carry out each subdivision step of the recursive procedure using pre-stored data associated with the user-specified journey or a newly created subdivision.

71. An integrated journey planner for providing travel information for a user-specified journey; the journey planner comprising;
   means for deconstructing a user enquiry specifying the journey into a plurality of information requests, each specifying a part of the journey using a single mode of transport;
   means for sending each request to an appropriate one of a plurality of knowledge stores, each store holding travel information regarding a different mode of transport; and
   means for reconstructing the responses to the requests received from the plurality of knowledge stores into at least one multi-modal travel option, for the user-specified journey, incorporating different modes of transport,
   wherein the sending means is arranged to send the requests to the different knowledge stores in batches, each batch containing requests with a specified start or end time.

72. An integrated journey planner according to claim 71, wherein the batches are sent sequentially from a user-defined time such that the start or end time results for one batch can be used as the end or start time specifications for the next batch.

73. An integrated journey planner according to claim 71, wherein within each batch, a plurality of requests are sent in parallel to the knowledge stores.

74. An integrated journey planner for providing travel information for a user-specified journey; the journey planner comprising:
   means for deconstructing a user enquiry specifying the journey into a plurality of information requests, each specifying a part of the journey using a single mode of transport;
   means for sending each request to an appropriate one of a plurality of knowledge stores, each store holding travel information regarding a different mode of transport; and
   means for reconstructing the responses to the requests received from the plurality of knowledge stores into at least one multi-modal travel option, for the user-specified journey, incorporating different modes of transport,
   wherein the reconstructing means is arranged to reconstruct the received responses into a plurality of multi-modal travel options over the user-specified journey, each travel option using a plurality of different modes of transport.

75. An integrated journey planner according to claim 74, wherein the reconstructing means is arranged recursively to combine together each of the received responses until all possible travel options corresponding graphically to the user-specified journey are assembled.

76. An integrated journey planner for providing travel information for a user-specified journey; the journey planner comprising:
   means for deconstructing a user enquiry specifying the journey into a plurality of information requests, each specifying a part of the journey using a single mode of transport;
   means for sending each request to an appropriate one of a plurality of knowledge stores, each store holding travel information regarding a different mode of transport; and
   means for reconstructing the responses to the requests received from the plurality of knowledge stores into at least one multi-modal travel option, for the user-specified journey, incorporating different modes of transport,
   wherein the reconstructing means is arranged recursively to combine together each of the received responses until all possible travel options corresponding geographically to the user-specified journey are assembled.

77. An integrated journey planner for providing travel information for a user-specified journey; the journey planner comprising:
   means for deconstructing a user enquiry specifying the journey into a plurality of information requests, each specifying a part of the journey using a single mode of transport;
   means for sending each request to an appropriate one of a plurality of knowledge stores, each store holding travel information regarding a different mode of transport;
   means for reconstructing the responses to the requests received from the plurality of knowledge stores into at least one multi-modal travel option, for the user-specified journey, incorporating different modes of transport;
   means for displaying travel options determined by the journey planner to the user; and
   means for selecting one of the displayed travel options, and booking means receptive to the selecting means for carrying out on-line booking of any of the selected modes of transport requiring ticket purchasing.

78. An integrated journey planner according to claim 77, further comprising means for obtaining information related to the selected travel option, the obtaining means being arranged to retrieve the desired information over a communications network.

79. An integrated journey planner according to claim 77, wherein the information includes one of the group comprising: weather reports; and city guides.

80. A method of providing journey information to a user, the method comprising:
   receiving unique location reference information identifying the start and end locations of a user-defined journey;
   considering at least some possible predetermined pairs of access points to a transport network of a single mode of transport, the access points being at different locations than the start and end locations;
   selecting those pairs of access points which minimize a selection factor between the start and end locations and the access points respectively;
   generating an information request containing a selected pair of access points and sending the request to a knowledge store holding information regarding the single mode of transport;
   constructing a travel option for the user-specified journey from the response received from the knowledge store;
   determining the unique location reference information from user-specified start and end location names,
   wherein the determining step comprises interpreting the user-entered location names by finding the closest matches to pre-stored location names having predetermined unique location references for use with the receiving step, and using artificial intelligence to determine acceptance of the closest matching pre-stored location names to the user-entered names.

81. A computer-readable medium/electrical carrier signal encoded with a program for causing a computer to perform the method of claim 80.

82. A method of providing journey information to a user, the method comprising:

receiving unique location reference information identifying the start and end locations of a user-defined journey;

considering at least some possible predetermined pairs of access points to a transport network of a single mode of transport, the access points being at different locations than the start and end locations;

selecting those pairs of access points which minimize a selection factor between the start and end locations and the access points respectively;

generating an information request containing a selected pair of access points and sending the request to a knowledge store holding information regarding the single mode of transport;

constructing a travel option for the user-specified journey from the response received from the knowledge store;

determining the unique location reference information from a user-specified location name and from an automatic current location of user determining procedure;

interpreting a user-entered location name by finding the closest match to pre-stored location names having predetermined location co-ordinates for use with the receiving step: and using artificial intelligence to determine acceptance of the closest matching pre-stored location names to the user-entered location name.

\* \* \* \* \*

UNITED STATES PATENT AND TRADEMARK OFFICE
CERTIFICATE OF CORRECTION

PATENT NO.      : 6,834,229 B2
DATED           : December 21, 2004
INVENTOR(S)     : Moshe Rafiah et al.

It is certified that error appears in the above-identified patent and that said Letters Patent is hereby corrected as shown below:

Column 1,
Line 30, "Sabre. Amadeus Gallileo" should read -- Sabre, Amadeus, Gallileo --;

Column 7,
Line 34, "factored In are" should read -- factored in are --;

Column 8,
Line 46, "front server 2" should read -- front server 22 --;

Column 12,
Line 39, "the routine engines and various routine" should read -- the routing engines and various routing --;
Line 57, "non-specific routine engines" should read -- non-specific routing engines --;

Column 14,
Line 11, "records 60 art then" should read -- records 60 are then --;

Column 15,
Line 22, "routine function 42" should read -- routing function 42 --;
Line 25, "is simple, purchased" should read -- is simply purchased --;

Column 17,
Line 15, "route i, worse" should read -- route is worse --;
Line 33, "specifice routine functions" should read -- specific routing functions --;

Column 22,
Line 29, "according to 1" should read -- according to claim 1 --;

UNITED STATES PATENT AND TRADEMARK OFFICE
CERTIFICATE OF CORRECTION

PATENT NO. : 6,834,229 B2
DATED : December 21, 2004
INVENTOR(S) : Moshe Rafiah et al.

It is certified that error appears in the above-identified patent and that said Letters Patent is hereby corrected as shown below:

<u>Column 28,</u>
Line 16, "each stare holding" should read -- each store holding --;

Signed and Sealed this

Seventh Day of June, 2005

JON W. DUDAS
*Director of the United States Patent and Trademark Office*